US007504451B1

(12) United States Patent
Brown et al.

(10) Patent No.: US 7,504,451 B1
(45) Date of Patent: Mar. 17, 2009

(54) FIRE RETARDANT COMPOSITIONS

(75) Inventors: Stephen Clifford Brown, Bicester (GB); Marie-Laure Bastiment, Le Mesnil Saint Denis (FR); Kenneth Arthur Evans, Chalfont St. Peter (GB); Javier Prieto Garcia, Abingdon (GB)

(73) Assignee: Rockwood Clay Additives, GmbH, Moosburg (DE)

( * ) Notice: Subject to any disclaimer, the term of this patent is extended or adjusted under 35 U.S.C. 154(b) by 0 days.

(21) Appl. No.: 10/031,003

(22) PCT Filed: Apr. 28, 2000

(86) PCT No.: PCT/GB00/01652

§ 371 (c)(1),
(2), (4) Date: Nov. 28, 2003

(87) PCT Pub. No.: WO00/66657

PCT Pub. Date: Nov. 9, 2000

(30) Foreign Application Priority Data

Apr. 30, 1999  (EP) .................................. 99303444

(51) Int. Cl.
C08K 3/34 (2006.01)
(52) U.S. Cl. .................. 524/445; 524/424; 524/425; 524/436; 524/437; 524/447; 524/449; 524/451; 524/494; 174/110 V; 174/119 C
(58) Field of Classification Search ............. 174/110 V, 174/119 C; 524/424–425, 436–437, 445, 524/451, 447, 449, 494
See application file for complete search history.

(56) References Cited

U.S. PATENT DOCUMENTS

| 1,756,236 | A | | 4/1930 | Beers | |
|---|---|---|---|---|---|
| 3,516,959 | A | | 6/1970 | Jonas | |
| 3,576,388 | A | * | 4/1971 | Bruns | 174/116 |
| 4,069,288 | A | | 1/1978 | Barkhuff, Jr. et al. | |
| 4,070,315 | A | | 1/1978 | Mehta et al. | |
| 4,173,561 | A | | 11/1979 | Tabana et al. | |
| 4,255,318 | A | * | 3/1981 | Kaide et al. | 524/786 |
| 4,391,637 | A | * | 7/1983 | Mardis et al. | 106/31.75 |
| 4,402,881 | A | | 9/1983 | Alther | |
| 4,410,364 | A | | 10/1983 | Finlayson et al. | |
| 4,412,018 | A | | 10/1983 | Finlayson et al. | |
| 4,434,075 | A | | 2/1984 | Mardis et al. | |
| 4,434,076 | A | | 2/1984 | Mardis et al. | |
| 4,472,538 | A | | 9/1984 | Kamigaito et al. | |
| 4,474,706 | A | | 10/1984 | Clay et al. | |
| 4,517,112 | A | | 5/1985 | Mardis et al. | |
| 4,546,126 | A | | 10/1985 | Breitenfellner et al. | |
| 4,558,075 | A | * | 12/1985 | Suss et al. | 523/216 |
| 4,582,866 | A | | 4/1986 | Shain | |
| 4,664,820 | A | | 5/1987 | Magauran et al. | |
| 4,695,402 | A | | 9/1987 | Finlayson et al. | |
| 4,708,975 | A | | 11/1987 | Shain | |
| 4,739,007 | A | | 4/1988 | Okada et al. | |
| 4,777,206 | A | * | 10/1988 | Rittler | 524/445 |
| 4,826,899 | A | | 5/1989 | Rees | |
| 4,866,018 | A | | 9/1989 | Elliot | |
| 4,874,728 | A | | 10/1989 | Elliot et al. | |
| 4,891,392 | A | | 1/1990 | Abe et al. | |
| 5,017,637 | A | | 5/1991 | Smith et al. | |
| 5,091,462 | A | | 2/1992 | Fukui et al. | |
| 5,132,350 | A | | 7/1992 | Keogh | |
| 5,164,460 | A | * | 11/1992 | Yano et al. | 524/445 |
| 5,236,985 | A | | 8/1993 | Hayami | |
| 5,429,999 | A | | 7/1995 | Nae et al. | |
| 5,554,670 | A | | 9/1996 | Giannelis et al. | |
| 5,747,560 | A | | 5/1998 | Christiani et al. | |
| 5,773,502 | A | | 6/1998 | Takekoshi et al. | |
| 5,780,376 | A | * | 7/1998 | Gonzales et al. | 501/146 |
| 5,827,906 | A | | 10/1998 | Metzemacher et al. | |
| 5,936,023 | A | | 8/1999 | Kato et al. | |
| 6,034,163 | A | | 3/2000 | Barbee et al. | |

(Continued)

FOREIGN PATENT DOCUMENTS

| EP | 0239986 | 10/1987 |
|---|---|---|
| EP | 0295336 | 12/1988 |
| EP | 0459472 | 12/1991 |
| EP | 1 022 314 A1 | 7/2000 |
| GB | 2113453 | 8/1983 |

(Continued)

OTHER PUBLICATIONS

Communication Of Notices Of Opposition relating to European Patent Application No. 00925503.5 from the European Patent Office including Notice Of Opposition by Akzo Nobel N.V. and Notice Of Opposition by Dow Chemical Company, Apr. 21, 2006.
English-language translation of Japan Patent Publication No. 9-95630, Jan. 30, 1996.
W.D. Keller and R.E. Grim, "Clays: Survey and Uses." *Kirk-Othmer Encyclopedia Of Chemical Technology*, 3rd Edition, vol. 6, John Wiley & Sons, (1979), pp. 190-223.
Giannelis "Flame Retardant Nanocomposite Materials", Annual Conference on Fire Research NISTIR 6242, Nov. 2-5, 1998, pp. 39-40.

(Continued)

*Primary Examiner*—Peter Szekely
(74) *Attorney, Agent, or Firm*—Meyertons, Hood, Kivlin, Kowert & Goetzel, P.C.; Eric B. Meyertons

(57) ABSTRACT

A polymer composition is provided that comprises a polymer and a synergistic flame retardant additive combination which comprises a nano-clay and a second filler. The second filler may be a material with known flame retardant properties, an inert filler or a combination of the same. The preferred nano-clay is Cloisite, the preferred second filler is aluminium trihydroxide. The presence of this flame retardant additive combination in polymers increases the strength of the char that forms during combustion. The formation of a strong char creates a barrier to ignition of the underlying material, for example electrical cables that have been provided with a coating of the polymeric composition.

21 Claims, 3 Drawing Sheets

U.S. PATENT DOCUMENTS

| | | | |
|---|---|---|---|
| 6,084,008 A * | 7/2000 | Liu | 523/179 |
| 6,103,805 A * | 8/2000 | Kojima et al. | 524/442 |
| 6,130,256 A | 10/2000 | Nao | |
| 6,139,962 A | 10/2000 | Herget et al. | |
| 6,380,295 B1 | 4/2002 | Ross et al. | |
| 6,414,070 B1 * | 7/2002 | Kausch et al. | 524/445 |
| 6,451,895 B1 * | 9/2002 | Topolkaraev et al. | 524/445 |
| 6,492,453 B1 * | 12/2002 | Ebrahimian et al. | 524/447 |
| 6,605,655 B1 | 8/2003 | Kato et al. | |
| 6,759,464 B2 * | 7/2004 | Ajbani et al. | 524/445 |
| 6,794,437 B2 | 9/2004 | Ross et al. | |
| 7,312,258 B2 | 12/2007 | Hoppler et al. | |

FOREIGN PATENT DOCUMENTS

| | | |
|---|---|---|
| JP | 55112248 | 8/1980 |
| JP | 62101644 | 5/1987 |
| JP | 62181144 | 8/1987 |
| JP | 63030588 | 2/1988 |
| JP | 63260957 | 10/1988 |
| JP | 63273693 | 11/1988 |
| JP | 995630 | 4/1997 |
| JP | 10139998 | 5/1998 |
| JP | 10204298 | 8/1998 |
| JP | 11228748 | 8/1999 |
| WO | WO9730950 | 8/1997 |
| WO | 97/31873 | 9/1997 |
| WO | WO9941060 | 8/1999 |
| WO | WO 00/06649 | 2/2000 |
| WO | WO0068312 | 11/2000 |

OTHER PUBLICATIONS

Miller, ed. "Tiny Clay Particles pack potent properties punch" Plastics World, Oct. 1997, pp. 36-38.

Laus, M. et al. "New hybrid Nanocomposites based on an organophilic clay and poly(styrene-butadiene) copolymers", Journal of Materials Research, Nov. 1997, vol. 12, pp. 3134-3139.

Kyaowa Chemical Industry Co., Ltd. Product "Additives for Resins", 1997, 2 pages.

U.S. Patent and Trademark Office "Communication" for U.S. Appl. No. 10/557,724 mailed Oct. 1, 2008; available in PAIR.

U.S. Patent and Trademark Office "Communication" for U.S. Appl. No. 10/541,496 mailed Sep. 21, 2007; available in PAIR.

U.S. Patent and Trademark Office "Communication" for U.S. Appl. No. 10/541,496 mailed Jul. 20, 2008; available in PAIR.

* cited by examiner

EVA 46: SILICA MAPPING

Si

EVA 47: SILICA MAPPING

Si

FIRE RETARDANT COMPOSITIONS

This invention relates to fire retardant or flame retardant (these terms being synonymous for present purposes) additives for polymeric materials. More particularly, it relates to such additive compositions which have the effect of increasing the strength of the char formed when plastics burn.

The combustion of a polymer leads to the formation of a carbonaceous residue, ash or char. Many fire tests, such as the single burning item (SBI), UL94 and 3 m-cube test (IEC1034—also mentioned in other standards, for example BS 6724:1990 appendix F), have shown the importance of the physical properties of this char in controlling the flammability of plastics. Foamy char structure appears to be more fire resistant than brittle, thin char. Additives that increase the amount of char formation are known to be effective fire retardants. Fire-retardant additives for Polymeric Materials—I. Char Formation from Silica Gel-Potassium Carbonate, J W Gilman et al, Fire and Materials, Vol 21, 23-32 (1997) contains a review of char formation in various plastics and reports on the effect that silica gel and potassium carbonate additives have on polymer flammability.

When a plastic cable burns, the slumping or dripping of flaming polymer promotes the progression of the fire. The formation of a stable char layer after combustion of a section of the cable may protect the underlying part of the cable structure as it creates a barrier to further ignition. Furthermore, the formation of a char layer is believed to be responsible for the reduction in the rate of heat release sometimes observed in the Cone Calorimeter. Additives which have the effect of increasing the strength of the char formed when a plastic coated cable burns are therefore extremely valuable.

Nano-composites, made by mixing two or more phases such as particles, layers or fibres, where at least one of the phases is in the nanometre size range, are well known. Nano-clays and nano-composite clays are also known.

WO 97/30950 describes the manufacture of one type of such clays from smectite, in particular montmorillonite, and its use in thermoplastics. A family of such nano-clays is sold under the trade mark Cloisite. These are the reaction product of a smectite-type clay and a mixture of a quaternary ammonium compound and a chain transfer agent. The table below gives the organic modifiers that are used for the different grades of Cloisite. The clays are said to be useful as additives or fillers for polymers. Each grade is adapted to use in a particular type of polymer. The resulting polymer composites can be moulded into articles by conventional shaping processes, such as injection moulding and extruding, so as to form for example components for the electrical and electronics industries. Among the properties noted for the polymer composites are improved ignition resistance and non-drip characteristics.

|  | Organic Modifier (1) | Modifier Concentration | % Moisture | % Weight Loss on Ignition |
|---|---|---|---|---|
| Cloisite ® 6A | 2M2HT | 140 meq/100 g | 2% | 47% |
| Cloisite ® 15A | 2M2HT | 125 meq/100 g | 2% | 43% |
| Cloisite ® 20A | 2M2HT | 95 meq/100 g | 2% | 38% |
| Cloisite ® 10A | 2MBHT | 125 meq/100 g | 2% | 39% |
| Cloisite ® 25A | 2MHTL8 | 95 meq/100 g | 2% | 34% |
| Cloisite ® 30A | MT2EtOH | 95 meq/100 g | 2% | 32% |

-continued

|  | Organic Modifier (1) | Modifier Concentration | % Moisture | % Weight Loss on Ignition |
|---|---|---|---|---|
| Cloisite ® Na$^+$ | (natural sodium montmorillonite) |  | 4% | 7% |

(1)
2M2HT: dimethyl dihydrogenated tallow ammonium
2MBHT: dimethyl benzyl hydrogenated tallow ammonium
2MHTL8: dimethyl hydrogenated tallow 2-ethylhexyl ammonium
MT2EtOH: methyl tallow bis-2hydroxy ethyl ammonium Nanocomposites: Radiative Gasification and Vinyl Polymer Flammability, J W Gilman et al., International Wire and Cable Symposium Proceedings 1997, 761-774 contains a report that nylon-6 clay-nano-composites have improved char characteristics compared to pure nylon-6. There is also teaching to add clays to other polymers such as polystyrene and polypropylene-based polymers.

Fire Retardant Polyetherimide Nanocomposites, Jongdoo Lee et al, Mat. Res. Soc. Symp. Proc. Vol. 457, 1997 Materials Research Society, 513-518 reports the improved char formation brought about by the addition of nano-composites to plastics.

U.S. Pat. No. 5,342,874 describes halogenated polymer formulations having flame retardant properties. They contain a synergistic flame retardant combination consisting of an aluminium or magnesium hydroxide and a tetravalent tin compound.

With the use of polymeric materials still on the increase, there is a need for improved fire retardant additives. The present invention is based on the finding that a combination of two or more previously known fire retardant additives gives a surprisingly strong effect.

According to this invention there is provided a polymer composition comprising a polymer and a synergistic flame retardant additive combination which comprises a nano-clay and a second filler, wherein, during combustion of the composition, a coherent char is formed.

A coherent char is a char which holds together and would not fall off an underside surface when that surface is positioned substantially horizontally.

It has been found that the presence of this flame retardant additive combination in polymers greatly increases the strength of the char that forms during combustion. As explained above, the formation of a strong char creates a barrier to ignition of the underlying material. The compositions of this invention are flame retardant at least in part because a strong char is formed.

The polymer composition of this invention may contain any nano-clay. However, Cloisite nano-clays (manufactured by Southern Clay Products, Inc) are particularly preferred.

With regard to the second filler, this could be a known flame retardant such as aluminium trihydroxide (ATH) or an inert filler such as chalk or talc or glass powder. ATH is particularly preferred. An inert filler is one that does not have a flame retardant effect when used alone in a polymer. Other known inert fillers or flame retardant fillers could be used instead of or in addition to those listed above and still produce a synergistic effect. Examples of these include: magnesium carbonate, magnesium hydroxide (which could be added as either the refined compound or the ore Brucite), hydromagnesite, Huntite, boehmite, bauxite, borates (e.g., zinc borates) and molybdates (e.g., ammonium molybdates) particularly in combination with ATH and the nano-clay. It is to be understood that these fillers may be added to the nano-clay containing composition either individually or in combinations of two or more.

The particle size of the second filler is preferably less than 10 µm, more preferably less than 5 µm, most preferably less than 2 µm. The second filler may have a surface area which is greater than 1 m²/g, preferably not greater than 35 m²/g.

The proportion of the nano-clay component to the other filler component in the compositions of this invention is typically from 90%:10% to 10%:90% by weight. The proportion of nano-clay is preferably between 1 and 20% by weight of the total filler content. The total filler content (i.e. nano-clay plus the other filler) is from 20% to 80%, preferably from 40% to 70% by weight. The compositions may also include further constituents which are routinely present in conventional fire retardant products, such as stabilisers.

According to a further aspect of the present invention, there is provided a polymer composition comprising a polymer and a synergistic flame retardant additive combination which comprises a nano-clay and a second filler comprising at least one of aluminium trihydroxide, magnesium carbonate, magnesium hydroxide (or the ore Brucite), hydromagnesite, Huntite, boehmite and bauxite.

According to a further aspect of the present invention, there is provided a polymer composition comprising a polymer and a synergistic flame retardant additive combination which comprises a nano-clay and a second filler comprising at least one of chalk, talc and glass powder.

The fire retardant additive combinations which characterise this invention are suitable for inclusion in a wide range of plastics. Examples of suitable polymers include polyamides, nylons, polyesters, epoxy resins, ABS combinations, halogenated polymers such as polyvinyl chloride (PVC), polyethylenes, polypropylenes, polyurethanes, polystyrenes, polychloroprene, phenolics, silicones, and silicone rubbers and copolymers and combinations of polymers. The particularly preferred use of the compositions of this invention is in cables for electrical or optical transmission. Flexible PVC has been a material of choice for cable sheathing for many years. The compositions may, for example, also be used to coat other moulded or extruded materials. The coating may be, for example, a sheath, jacket or insulation.

According to a further aspect of the present invention, there is provided the use of the polymer composition as a char promoter.

There is also provided a char promoting composition comprising a polymer and a synergistic flame retardant additive combination which comprises a nano-clay and a second filler.

According to a further aspect of the present invention, there is provided a method of improving the char promoting properties of a polymer composition, which method comprises the steps of combining a polymer and a synergistic flame retardant additive combination which comprises a nano-clay and a second filler.

The compositions of this invention result from the finding that adding a nano-clay, such as Cloisite, and a second filler, such as ATH, to plastics surprisingly and significantly increases the strength of the char that forms during combustion. The reason for this synergistic effect is not known. It is possible that the ATH or other filler aids mixing of the clay and the polymer, or perhaps there is some chemical or physical effect that occurs during burning, or perhaps the fillers mechanically reinforce the char, or the filler acts as a support for the nanoclay, but the applicant is not restricted to these explanations.

The synergistic effect is illustrated in the following example. Of the three sample formulations tested (namely: one with ATH alone, one with nano-clay alone and one with both of these additives), only the sample of the composition according to this invention was able to pass the char test.

The invention will now be described, by way of illustration, with reference to the following examples and in which.

EXAMPLE 1

Formulations

Figure 1:
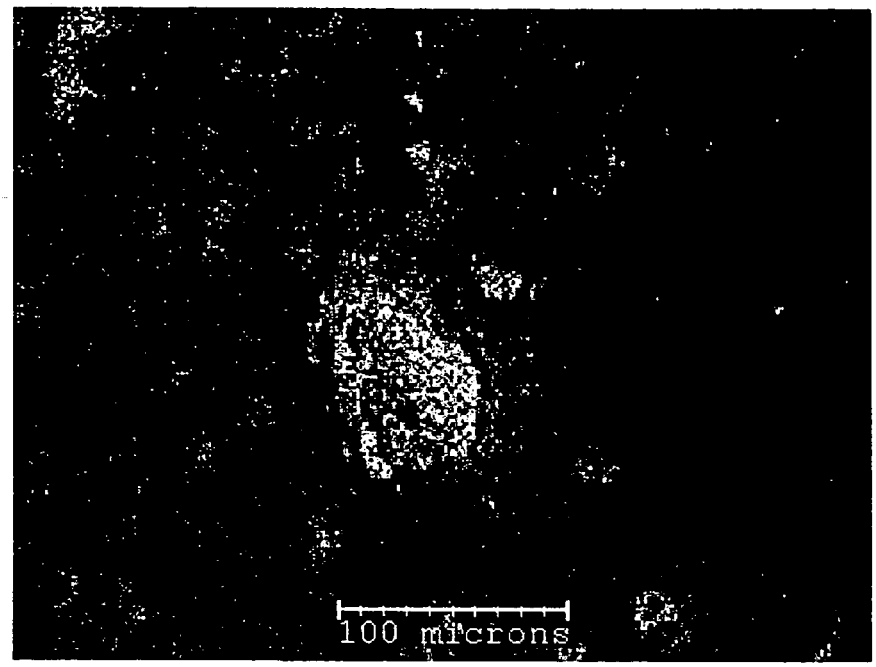
FIGS. 1 and 2 show silica mapping of Example 1.

The following three formulations were prepared according to the procedure described below.

EVA45 is based on 65% ATH, EVA46 on 5% nano-clay, and EVA47 on 60% ATH plus 5% nano-clay. All percentages are by weight.

| Ingredients | EVA045-99 | EVA046-99 | EVA047-99 |
|---|---|---|---|
| Escorene Ultra 00119 (EVA) | 100 | 100 | 100 |
| SF7E (ATH) | 185 | — | 170 |
| Cloisite 30A | — | 5.3 | 15 |
| Aminosilane 1100 (coating for ATH) | 1.85 | — | 1.7 |
| Irganox 10-10 (stabiliser) | 0.5 | 0.5 | 0.5 |

The figures quoted in the table are "phr", i.e. parts by weight per hundred parts of polymer. In the table, the compositions are given in parts by weight.

Procedure:

Mixing

EVA45 and EVA47 were produced on a Banbury BR1600 (batch mixer) according to the following procedure. The ingredients were added in the following order:

1$^{st}$ addition: Escorene+half of the filler.

2$^{nd}$ addition: half of the filler+silane+stabiliser (+nano-clay for EVA47).

They were mixed until the ingredients were adequately dispersed.

A different recipe was used to mix EVA46. Namely, the three ingredients were placed together and mixed until an adequate dispersion was obtained.

The batches from the Banbury mixer were then calendered on the two roll mill at approximately 95° C. to form a hide. 3 mm thick by 15 cm square plaques were compression moulded at 150° C. from the hide and 5 cm square samples were cut out from the plaques and tested according to the char test procedure (described below).

A plaque of each of the compounds EVA46 and EVA47 was frozen using liquid nitrogen, and broken into 2 pieces. The fractured surface was then analysed using EDS mapping. Aluminium and silicon enriched areas were mapped to determine whether the nano-clay was well dispersed.

Char Test Procedure

The samples to be subjected to the test are in the form of panels measuring 5 cm² and 3 mm in thickness. They are held vertically by means of a U-shaped frame. A load cell incorporated in the frame is connected to a chart recorder.

Once the apparatus has been set up, a fish tail flame is applied to the bottom edge of the panel. The flame impinges along the whole length of the bottom edge of the panel in the frame. It is allowed to burn and the mass of the panel diminishes. The chart recorder plots mass loss against time.

The test continues until either there is no more mass loss or there is a sudden mass loss. If the sample under test has formed a strong char which is staying in place (this is an example of a coherent char), the mass loss curve will by asymptotic to time. At the end of the test, the sample either falls out of the frame or stays in the frame. In the latter case, the sample panel can be tapped and if it still remains in the frame then a strong char has been formed during its combustion.

The tapping test was carried out on samples subjected to the char test that did not show substantial sudden weight loss during the test. Although subjective, it provides a good indication of how coherent the char is. The test is performed by tapping the char with a metal spatula. Char that disintegrates or falls off easily is rated 1 or 2. Char requiring a harder tap to cause it to break off was rated 3 or 4 and deemed to have passed the test. The most coherent char that survived tapping was rated 5.

Results:

Both EVA45 and EVA46 failed the test and fell from the sample holder in about one minute. EVA47 stayed on the sample holder for the whole duration of the test. It gave a total mass loss of 49% and a strong char.

Figure 2:
Figure 3:
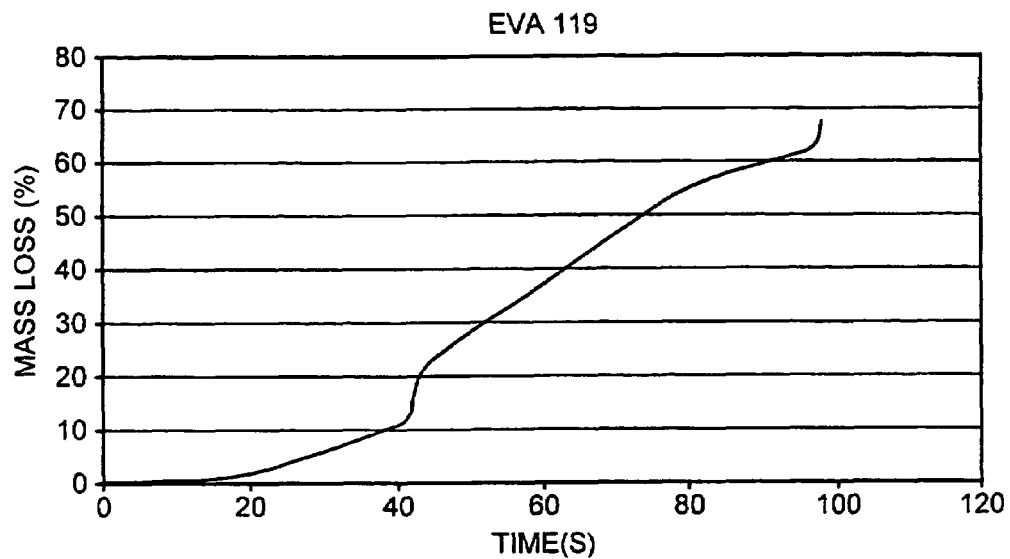
FIGS. 3 to 6 show char test results for Example 2.
Figure 4:
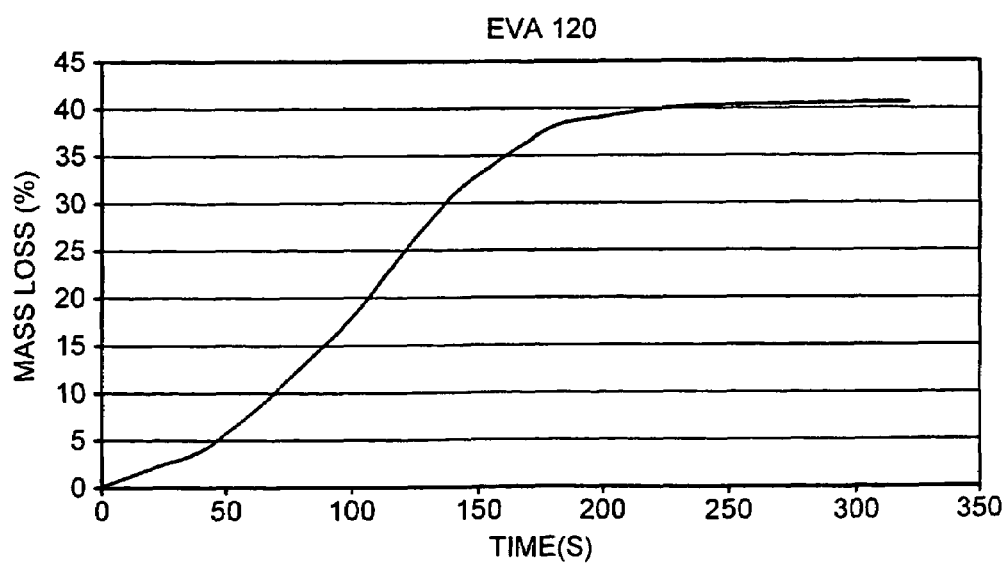
Figure 5:
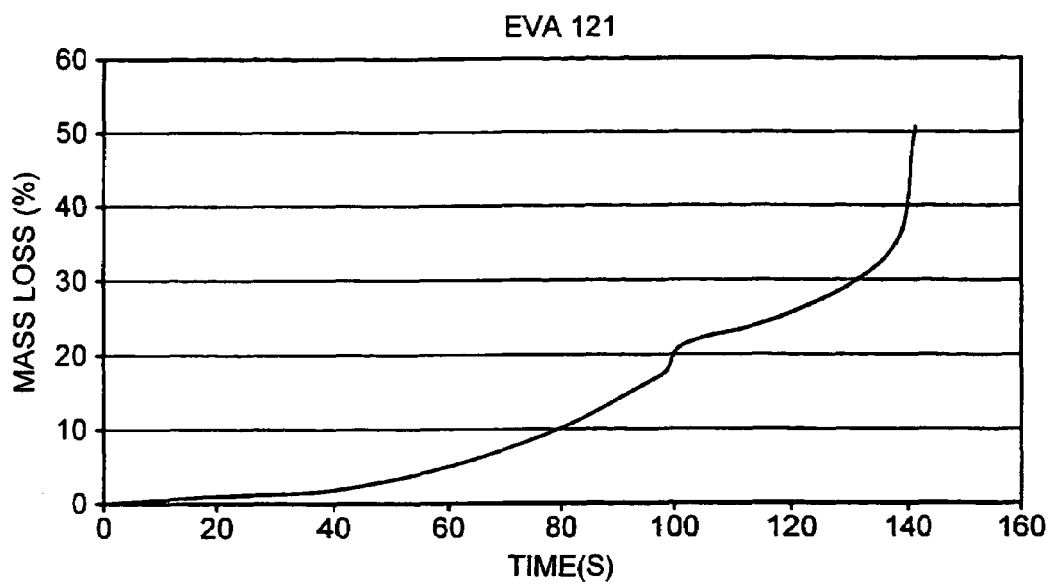
Figure 6:
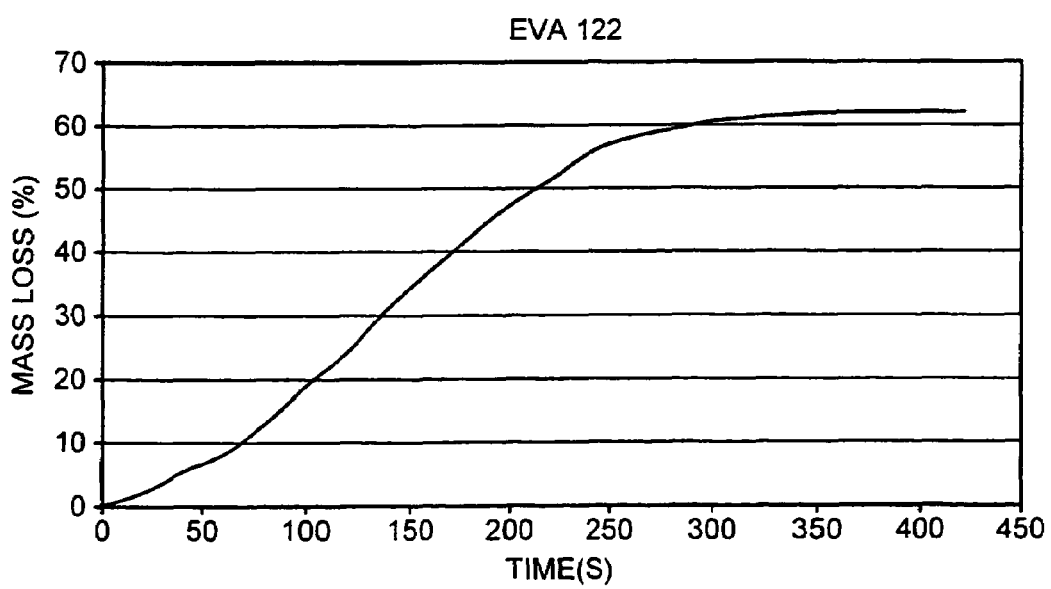

The nano-clay is mainly constituted of silica. Therefore, silica was mapped on both EVA46 and EVA47. The results are shown in FIGS. 1 and 2 (the silicon clusters, representing clay, appear as white dots). EVA46 showed large agglomerates of clay (up to 100 em). Clay particles up to 10 μm were still visible in EVA47.

Neither ATH nor nano-clay gave a strong enough char when used on their own at the conventionally recommended addition levels. The results demonstrate that the only way to obtain a strong char is to use both together.

Very coarse agglomerates of clay were observed in EVA46. Agglomerates were still visible in EVA47 but were much smaller. The ATH seems to have helped the dispersion or mixing of the clay. This could explain the results obtained during the char test. However, it is not clear if this is the only explanation for the strength of the char.

EXAMPLE 2

Formulations

The following formulations were prepared according to the procedure described below.

EVA119 and EVA121 are based on 65% filler, EVA120 and EVA122 60% filler plus 5% nano-clay. All percentages are by weight.

| Ingredients | EVA119 | EVA120 | EVA121 | EVA122 |
|---|---|---|---|---|
| Escorene Ultra 00119 | 100 | 100 | 100 | 100 |
| Polcarb | 185 | 170 | — | — |
| Ultracarb 5 | — | — | 185 | 170 |
| Cloisite 30A | — | 15 | — | 15 |
| Irganox 10-10 | 0.5 | 0.5 | 0.5 | 0.5 |

In the table, the compositions are given in parts by weight.

Polcarb is a 1-micron $CaCO_3$ with a surface area of 7 $m^2/g$ sold by ECC.

Ultracarb 5 is a mix of huntite ($Mg_3Ca(CO_3)_4$) and hydromagnesite ($Mg_4(CO_3)_3(OH)_2 3H_2O$), with a $d_{50}$ lower than 1 micron and a surface area of 15 $m^2/g$, that is sold by Microfine Minerals.

Cloisite 30A is a nanoclay sold by South Clay Products and which has been treated using a surface modifier specially chosen for EVA polymers.

Procedure:

EVA119, 120, 121 and 122 were produced on the Banbury BR1600 according to the following procedure:

$1^{st}$ addition: Escorene+half of the filler (+nanoclay for EVA120 and EVA122) then mix.

$2^{nd}$ addition: half of the filler+stabiliser then mix and afterwards cool for 2 minutes at 10 RPM.

5 cm square samples were prepared and tested in the char test as described in Example 1.

Results (see FIGS. 3 to 6):

Char Test/LOI

Both EVA119 and EVA121 failed the char test in one to two minutes. EVA120 and EVA122 passed the test. They gave a char strength respectively 3 and 4.

| | EVA119 | EVA120 | EVA121 | EVA122 |
|---|---|---|---|---|
| Max Total Mass Loss by Char Test | — | 40.5% | — | 62% |

It can be seen that both fillers alone failed the char test, but passed in the presence of the nanoclay. The filler alone does not give any char. The clay alone is dragged down from the sample support by the melting polymer before acting as a char promoter.

The invention claimed is:

1. A polymer composition comprising:
  a polymer, wherein the polymer is selected from the group consisting of at least one of polyesters, epoxy resins, ABS combinations, halogenated polymers, polyethylene, polystyrene, silicones, silicone rubbers, ethyl vinyl acetate, and their copolymers; and
  a synergistic flame retardant additive combination, the synergistic flame retardant additive combination comprising a nano-clay and a second filler, wherein the second filler is selected from the group consisting of at least one of aluminum trihydroxide, magnesium carbonate, magnesium hydroxide, brucite ore, hydromagnesite, Huntite, boehmite and bauxite, and wherein, during combustion of the polymer composition, a coherent char is formed.

2. A cable or wire coating formed from a polymer composition according to claim 1.

3. A molded or extruded material coated with a polymer composition according to claim 1.

4. A method of promoting char formation comprising the step of burning the polymer composition according to claim 1.

5. The polymer composition of claim 1, wherein the polymer composition comprises polyvinyl chloride.

6. A method of improving the char promoting properties of a polymer composition, comprising: combining the polymer composition and a synergistic flame retardant additive combination to form a mixture, wherein the polymer is selected from the group consisting of at least one of polyesters, epoxy resins, ABS combinations, halogenated polymers, polyethylene, polystyrene, silicones, silicone rubbers, ethyl vinyl acetate, and their copolymers, and wherein the synergistic flame retardant comprises a nano-clay and a second filler, wherein the second filler is selected from the group consisting of at least one of aluminum trihydroxide, magnesium carbonate, magnesium hydroxide, brucite ore, hydromagnesite, Huntite, boehmite and bauxite.

7. The method of claim 6, wherein the polymer composition comprises polyvinyl chloride.

8. A polymer composition comprising:
a polymer, wherein the polymer is selected from the group consisting of at least one of polyesters, polyethylene, polystyrene, silicones, silicone rubbers, ethyl vinyl acetate, and their copolymers; and
a synergistic flame retardant additive combination comprising a nano-clay and a second filler, wherein the second filler comprises aluminum trihydroxide, and wherein during combustion of the composition, a coherent char is formed.

9. The polymer composition of claim 8, wherein the second filler further comprises a flame retardant filler, an inert filler or a combination thereof.

10. The polymer composition of claim 8, wherein the second filler further comprises magnesium carbonate, magnesium hydroxide, brucite ore, hydromagnesite, Huntite, boehmite or bauxite.

11. The polymer composition of claim 8, wherein the second filler further comprises chalk, talc or glass powder.

12. The polymer composition of claim 8, wherein the proportion of the nano-clay to the second filler is from 90:10 to 10:90 by percent weight.

13. The polymer composition of claim 8, wherein the total filler content is from 20% to 80% by weight.

14. The polymer composition of claim 8, wherein the nano-clay comprises smectite.

15. A cable or wire coating formed from a polymer composition according to claim 8.

16. A molded or extruded material coated with a polymer composition according to claim 8.

17. A method of promoting char formation comprising the step of burning the polymer composition according to claim 8.

18. A method of improving the char promoting properties of a polymer composition, comprising: combining a polymer and a synergistic flame retardant additive combination to form a mixture, wherein the polymer is selected from the group consisting of at least one of polyesters, polyethylene, polystyrene, silicones, silicone rubbers, ethyl vinyl acetate and their copolymers, wherein the synergistic flame retardant additive comprises a nano-clay and a second filler, and wherein the second filler comprises aluminum trihydroxide.

19. The method of claim 18, wherein the second filler further comprises a flame retardant filler, an inert filler, or a combination thereof.

20. The method of claim 18, wherein the second filler further comprises magnesium carbonate, magnesium hydroxide, brucite ore, hydromagnesite, Huntite, boehmite or bauxite.

21. The method of claim 18, wherein the second filler further comprises chalk, talc or glass powder.

* * * * *

US007504451C1

(12) EX PARTE REEXAMINATION CERTIFICATE (8449th)
United States Patent
Brown et al.

(10) Number: US 7,504,451 C1
(45) Certificate Issued: Aug. 2, 2011

(54) FIRE RETARDANT COMPOSITIONS

(75) Inventors: Stephen Clifford Brown, Bicester (GB); Marie-Laure Bastiment, Le Mesnil Saint Denis (FR); Kenneth Arthur Evans, Chalfont St. Peter (GB); Javier Prieto Garcia, Abingdon (GB)

(73) Assignee: Rockwood Clay Additives, GmbH, Moosburg (DE)

Reexamination Request:
No. 90/009,753, Sep. 10, 2010

Reexamination Certificate for:
Patent No.: 7,504,451
Issued: Mar. 17, 2009
Appl. No.: 10/031,003
Filed: Nov. 28, 2003

(22) PCT Filed: Apr. 28, 2000

(86) PCT No.: PCT/GB00/01652
§ 371 (c)(1),
(2), (4) Date: Nov. 28, 2003

(87) PCT Pub. No.: WO00/66657
PCT Pub. Date: Nov. 9, 2000

(30) Foreign Application Priority Data
Apr. 30, 1999 (EP) .......................................... 99303444

(51) Int. Cl.
*B29B 9/12* (2006.01)
*C08K 3/34* (2006.01)
*C08K 3/00* (2006.01)
*B29K 101/00* (2006.01)
*C08L 101/00* (2006.01)

(52) U.S. Cl. ................ 524/445; 174/110 V; 174/119 C; 524/447; 524/451; 524/494; 524/449; 524/437; 524/424; 524/436; 524/425

(58) Field of Classification Search .................... 524/445
See application file for complete search history.

(56) References Cited

U.S. PATENT DOCUMENTS

| | | | |
|---|---|---|---|
| 4,251,430 | A | 2/1981 | Kennedy-Skipton et al. |
| 4,983,742 | A | 1/1991 | Yusawa et al. |
| 5,057,367 | A | 10/1991 | Morii et al. |
| 5,091,462 | A | 2/1992 | Fukui et al. |
| 5,139,875 | A | 8/1992 | Metzemacher et al. |
| 5,552,459 | A | 9/1996 | Baumann et al. |
| 5,973,053 | A | 10/1999 | Usuki et al. |
| 6,521,690 | B1 | 2/2003 | Ross et al. |
| 6,610,770 | B1 | 8/2003 | Ross et al. |
| 6,750,282 | B1 | 6/2004 | Schall et al. |
| 7,528,191 | B2 | 5/2009 | Metzemacher et al. |

FOREIGN PATENT DOCUMENTS

| | | |
|---|---|---|
| EP | 253635 | 1/1988 |
| EP | 561548 | 9/1993 |
| EP | 0611796 | 8/1994 |
| EP | 899301 | 3/1999 |
| EP | 0909786 | 4/1999 |
| JP | 09-095630 A | 4/1997 |
| RO | 110519 B1 | 1/1996 |

OTHER PUBLICATIONS

European Patent Office Summons to attend oral proceedings pursuant to Rule 115(1) EPC in opposition proceedings of European Patent No. EP1177252 mailed May 20, 2010, 5 pages.
European Patent Office "Brief Communication" in opposition proceedings of European Patent No. EP1177252 mailed Nov. 2, 2010, 25 pages.
European Communication "Notice to File Comments" in Opposition to European Patent No. 1183306, mailed Oct. 27, 2009, 22 pages.
Technical data sheet of BENTONE SD-2, Feb. 2007, 2 pages.
Technical data sheets of CLOISITE, printed in 2006, 10 pages.
Wikipedia excerpt about specific surface area, Sep. 17, 2009, 2 pages.
Canadian Office Action for Canadian Application No. 2,731,300, Nov. 29, 2005, 4 pages.
Canadian Office Action for Canadian Application No. 2,731,300, Oct. 25, 2006, 1 page.
Canadian Office Action for Canadian Application No. 2,731,300, Nov. 13, 2007, 1 page.
Canadian Office Action for Canadian Application No. 2,731,300, Nov. 14, 2008, 2 pages.
Canadian Office Action for Canadian Application No. 2,731,300, Sep. 22, 2009, 1 page.
Canadian Office Action for Canadian Application No. 2,731,300, May 4, 2010, 1 page.
European Communication regarding third party comments for European Patent Application No. 00910805, Oct. 12, 2004, 9 pages.
European Office Action for European Patent Application No. 00925503.5, Feb. 19, 2003, 4 pages.
International Preliminary Examination Report and Search Report for European Patent Application No. 00910805, May 7, 1999, 10 pages.
Encyclopedia Chemical, Kyoritsu Shuppan Co., Ltd, Jul. 15, 1961, 3 pages.
United States Patent and Trademark "Communication" for U.S. Appl. No. 10/557,724 mailed Mar. 19, 2010, 11 pages.

(Continued)

*Primary Examiner*—Jerry D. Johnson

(57) ABSTRACT

A polymer composition is provided that comprises a polymer and a synergistic flame retardant additive combination which comprises a nano-clay and a second filler. The second filler may be a material with known flame retardant properties, an inert filler or a combination of the same. The preferred nano-clay is Cloisite, the preferred second filler is aluminium tri-hydroxide. The presence of this flame retardant additive combination in polymers increases the strength of the char that forms during combustion. The formation of a strong char creates a barrier to ignition of the underlying material, for example electrical cables that have been provided with a coating of the polymeric composition.

OTHER PUBLICATIONS

United States Patent and Trademark "Communication" for U.S. Appl. No. 10/557,724 mailed Jun. 30, 2010, 3 pages.
United States Patent and Trademark "Communication" for U.S. Appl. No. 10/557,724 mailed Jul. 19, 2010, 10 pages.
United States Patent and Trademark "Notice of Allowance and Fees Due" for U.S. Appl. No. 10/557,724 mailed Sep. 1, 2010, 9 pages.
European Patent Office, "Minutes of the oral proceedings before the Opposition Division" for EP Patent No. EP–B–1177252, mailed Dec. 21, 2010, 16 pages.
European Patent Office, "Interlocutory decision in Opposition proceedings" for EP Patent No. EP–B–1177252, mailed Dec. 21, 2010, 25 pages.
NISTIR Publication, "Interactions of Polymers with Fillers and Nanocomposites", NIST, Jun. 18–19, 1998: A workshop Report, Karim, Mar. 1999, pp. 2–77.
Giannelis, "Polymer Layered Silicate Nano–Composites," Adv. Mater. 1996, 8, No. 1, pp. 29–35.
Gilman, et al., Proceedings of 46th International Wire and Cable Symposium, Nov. 17, 18, 19 and 20, 1997, "Nanocomposites: Radiative Gasification And Vinyl Polymer Flammability," pp. 761–774.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 8 and 18 are determined to be patentable as amended.

Claims 2-5, 7, 9-17 and 19-21, dependent on an amended claim, are determined to be patentable.

New claims 22-29 are added and determined to be patentable.

1. A polymer composition comprising:
a polymer, wherein the polymer is selected from the group consisting of at least one of [polyesters, epoxy resins], ABS combinations, halogenated polymers, polyethylene, polystyrene, silicones, silicone rubbers, ethyl vinyl acetate, and their copolymers; and
a synergistic flame retardant additive combination, the synergistic flame retardant additive combination comprising a nano-clay and a second filler, wherein the second filler is selected from the group consisting of at least one of aluminum trihydroxide, magnesium carbonate, magnesium hydroxide, brucite ore, hydromagnesite, Huntite, boehmite and bauxite, and wherein, during combustion of the polymer composition, a coherent char is formed.

6. A method of improving the char promoting properties of a polymer composition, comprising:
combining the polymer composition and a synergistic flame retardant additive combination to form a mixture, wherein the polymer is selected from the group consisting of at least one of [polyesters, epoxy resins], ABS combinations, halogenated polymers, polyethylene, polystyrene, silicones, silicone rubbers, ethyl vinyl acetate, and their copolymers, and wherein the synergistic flame retardant *additive combination* comprises a nano-clay and a second filler, wherein the second filler is selected from the group consisting of at least one of aluminum trihydroxide, magnesium carbonate, magnesium hydroxide, brucite ore, hydromagnesite, Huntite, boehmite and bauxite.

8. A polymer composition comprising:
a polymer, wherein the polymer is selected from the group consisting of at least one of [polyesters], polyethylene, polystyrene, silicones, silicone rubbers, ethyl vinyl acetate, and their copolymers; and
a synergistic flame retardant additive combination comprising a nano-clay and a second filler, wherein the second filler comprises aluminum trihydroxide, and wherein during combustion of the composition, a coherent char is formed.

18. A method of improving the char promoting properties of a polymer composition, comprising:
combining a polymer and a synergistic flame retardant additive combination to form a mixture, wherein the polymer is selected from the group consisting of at least one of [polyesters], polyethylene, polystyrene, silicones, silicone rubbers, ethyl vinyl acetate and their copolymers, wherein the synergistic flame retardant additive *combination* comprises a nano-clay and a second filler, and wherein the second filler comprises aluminum trihydroxide.

*22. A polymer composition comprising:*
*a polymer, wherein the polymer is selected from the group consisting of at least one of epoxy resins, ABS combinations, halogenated polymers, polyethylene, polystyrene, silicones, silicone rubbers, ethyl vinyl acetate, and their copolymers; and*
*a synergistic flame retardant additive combination, the synergistic flame retardant additive combination comprising a nano-clay and a second filler, wherein the synergistic flame retardant additive combination comprises from about 5% to about 20% by weight of nano-clay, wherein the second filler is selected from the group consisting of at least one of aluminum trihydroxide, magnesium carbonate, magnesium hydroxide, brucite ore, hydromagnesite, Huntite, boehmite and bauxite, and wherein, during combustion of the polymer composition, a coherent char is formed.*

*23. A method of improving the char promoting properties of a polymer composition, comprising:*
*combining a polymer and at least a portion of a synergistic flame retardant additive combination to form a mixture, wherein the polymer is selected from the group consisting of at least one of epoxy resins, ABS combinations, halogenated polymers, polyethylene, polystyrene, silicones, silicone rubbers, ethyl vinyl acetate, and their copolymers; and the synergistic flame retardant additive combination comprises a nano-clay and a second filler, wherein the synergistic flame retardant additive combination comprises from about 5% to about 20% by weight of nano-clay, and wherein the second filler is selected from the group consisting of at least one of aluminum trihydroxide, magnesium carbonate, magnesium hydroxide, brucite ore, hydromagnesite, Huntite, boehmite, and bauxite.*

*24. The polymer composition of claim 1, wherein the polymer comprises ethyl vinyl acetate or polyethylene.*

*25. A cable or wire coating formed from a polymer composition of claim 1, wherein the polymer comprises ethyl vinyl acetate or polyethylene.*

*26. A cable or wire coating formed from a polymer composition of claim 1, wherein the polymer comprises ethyl vinyl acetate.*

*27. A cable or wire coated with a polymer composition of claim 1, wherein the polymer comprises polyethylene.*

*28. A molded or extruded material coated with a polymer composition of claim 1, wherein the polymer comprises ethyl vinyl acetate or polyethylene.*

*29. A molded or extruded material coated with a polymer composition of claim 1, wherein the polymer comprises ethyl vinyl acetate.*

* * * * *